(12) United States Patent
Merritt

(10) Patent No.: US 6,302,067 B1
(45) Date of Patent: Oct. 16, 2001

(54) INTERNAL COMBUSTION ENGINE

(76) Inventor: Dan Merritt, 139 Bagington Road, Stychevale, Coventry, CV3 6FY (GB)

(*) Notice: Subject to any disclaimer, the term of this patent is extended or adjusted under 35 U.S.C. 154(b) by 0 days.

(21) Appl. No.: 09/447,839

(22) Filed: Nov. 23, 1999

(30) Foreign Application Priority Data

Nov. 24, 1998 (GB) .................................................. 9825609
Jul. 30, 1999 (GB) .................................................. 9917921

(51) Int. Cl.$^7$ ..................................................... F02B 75/04
(52) U.S. Cl. .................... 123/48 D; 123/48 A; 123/78 A
(58) Field of Search ............................. 123/48 D, 48 A, 123/78 A, 78 D

(56) References Cited

U.S. PATENT DOCUMENTS 1,283,331 * 10/1918 Seitz .
1,719,752 * 7/1929 Brown .
3,970,056 * 7/1976 Morris ................................. 123/48 D
4,104,995 * 8/1978 Steinbock ........................... 123/78 D

* cited by examiner

Primary Examiner—Tony M. Argenbright
Assistant Examiner—Katrina B. Harris
(74) Attorney, Agent, or Firm—Flanagan & Flanagan; John R. Flanagan; John K. Flanagan

(57) ABSTRACT

The present invention relates to an unthrottled internal combustion engine of segregating, spark ignited, form, i.e. in which the bulk of the fuel does not begin to mix with the bulk of the air until near the end of the compression stroke, shortly before spark ignition. The invention utilizes a second cylinder in communication with the main cylinder, fuel being delivered to vaporize within the second cylinder. Attached to the second cylinder is a cavity containing the spark ignition device, into which cavity is delivered a controlled quantity of fuel which mixes with air entering into the cavity during the compression stroke of the engine to provide a spark plug with substantially stoichiometric fuel/air mixture at the moment of ignition, irrespective of the output of the engine.

12 Claims, 7 Drawing Sheets

INTERNAL COMBUSTION ENGINE

FIELD OF THE INVENTION

The present invention relates to an internal combustion engine.

A "segregating engine" is an engine where the bulk of the fuel does not begin to mix with the bulk of the air inducted by the engine until near the end of the compression stroke, just before ignition, and various internal combustion engines which can be classified as segregating engines are known, for example from GB-A-2155546, GB-A-2186913, GB-A-2218153, GB-A-2238830, GB-A-2246394, GB-A-2261028, GB-A-2268544, GB-A-2279407, and U.S. Pat. No. 5,803,026. The engines of these documents are now known in the literature as the Merritt engines.

The diesel engine is also a segregating engine whereas the spark ignition gasoline engine (SIGE) compresses a premixed mixture of fuel and air.

An important characteristic of segregating engines such as the diesel and Merritt engines is the confinement of the fuel, away from most of the air, until just before the moment of ignition, and the rapid delivery of the fuel into the combustion chamber near the end of the compression stroke.

DESCRIPTION OF THE PRIOR ART

In the Merritt engines fuel can enter a second cylinder/piston arrangement during the exhaust and/or induction strokes of the larger conventional piston and is confined to the second cylinder by the second piston, where it is substantially vaporised whilst being kept away from most of the air, until near the end of the compression stroke. At the moment the second piston delivers this fuel to the combustion chamber. The Merritt engine has some similarity with the diesel engine but it allows the fuel time to vaporise and mix with some air to form a rich gaseous mixture before it enters the combustion chamber. Like a diesel engine, the Merritt engines can operate without throttling the air intake, from full power down to idling.

When using spark ignition, the Merritt engines seek to ensure that the spark plug is provided with a fuel/air mixture which can be ignited cycle after without malfunction.

SUMMARY OF THE INVENTION

The present invention seeks to provide an improved internal combustion engine, in particular to provide the means of providing the spark plug with a closely controlled fuel/air mixture under all fuelling conditions.

Accordingly, the present invention provides an internal combustion engine comprising:

at least one pair of first and second cylinders, the first cylinder having a larger swept volume than the second cylinder;

respective first and second pistons reciprocable in said cylinders, the second piston dividing the second cylinder into a first volume and a second volume, the second volume being between the two-pistons;

air inlet means communicating with the first cylinder;

exhaust means communicating with the first cylinder;

means defining a common combustion space between said pistons when said pistons are substantially at their inner dead centre positions, said combustion space including said second volume;

transfer means enabling gas flow from said first volume into said second volume towards the end of the compression stroke of the second piston;

inhibiting means for inhibiting movement of fuel/air mixture from said first volume into said second volume until towards the end of the compression stroke of said second piston;

a first fuel source for providing fuel to the first volume;

drive means for driving said second piston;

cavity means formed in a side wall of the second cylinder and opening into said second cylinder through aperture means;

spark ignition means located in said cavity means;

characterised by fuel delivery means for supplying a quantity of fuel into said cavity means to form a spark-ignitable fuel/air mixture inside the cavity means, said quantity of fuel being determined independently of the amount of fuel delivered by the first fuel source to meet the engine's power demand.

It is a feature of the invention that during the compression stroke of the first piston substantially pure air is delivered into the cavity means through the aperture means to mix with the quantity of fuel delivered into the cavity means, the fuel delivered into the cavity means being quantified irrespective of the overall fuel quantity delivered to the engine to meet its power demand.

Preferably, the fuel delivery means delivers substantially liquid fuel into the cavity means. Preferably also, the first fuel source is also the fuel delivery means. Desirably, the aperture means is aligned with the first fuel source.

Desirably, the crown of the second piston obscures the aperture means from the first fuel source during part of its range of movement, and exposes the aperture means to the first fuel source during another part of its range of movement.

Alternatively, the fuel delivery means is connected to a wall of the cavity means. In such embodiments, the fuel delivery means may deliver substantially liquid fuel or substantially gaseous fuel into the cavity means.

Preferably in the alternative embodiments, the first fuel source delivers a fuel quantity directly into the first volume, and the fuel delivery means delivers another fuel quantity directly into the cavity means. It will be understood that the fuel quantity delivered by the first fuel source is governed by the engine's power demand and is independent of the requirement for reliable and efficient spark ignition, whilst the fuel quantity delivered by the fuel delivery means is not governed by the engine's power demand but is chosen to enable reliable and efficient spark ignition.

Preferably the drive means includes means for maintaining the second piston substantially stationary at or adjacent its inner dead centre position during at least a portion of the expansion stroke of the first piston.

BRIEF DESCRIPTION OF THE DRAWINGS

The present invention is further described hereinafter, by way of example, with reference to accompanying drawings, in which.

DETAILED DESCRIPTION OF THE EXEMPLARY EMBODIMENTS

Figure 1:
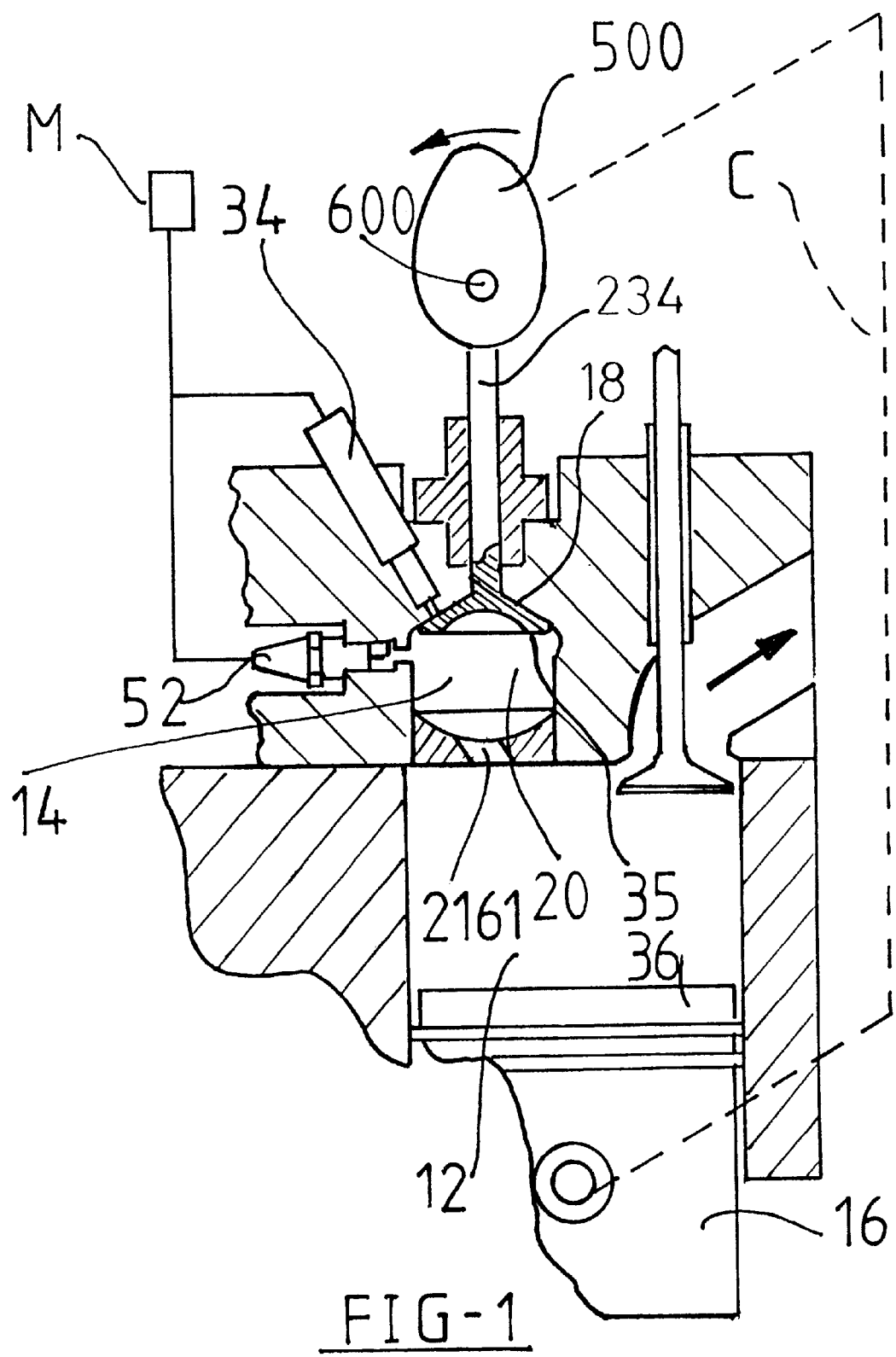
FIG. 1 is a section through a portion of both cylinders of a four-stroke engine according to the prior art, shown at the end of the expansion stroke.
Figure 2:
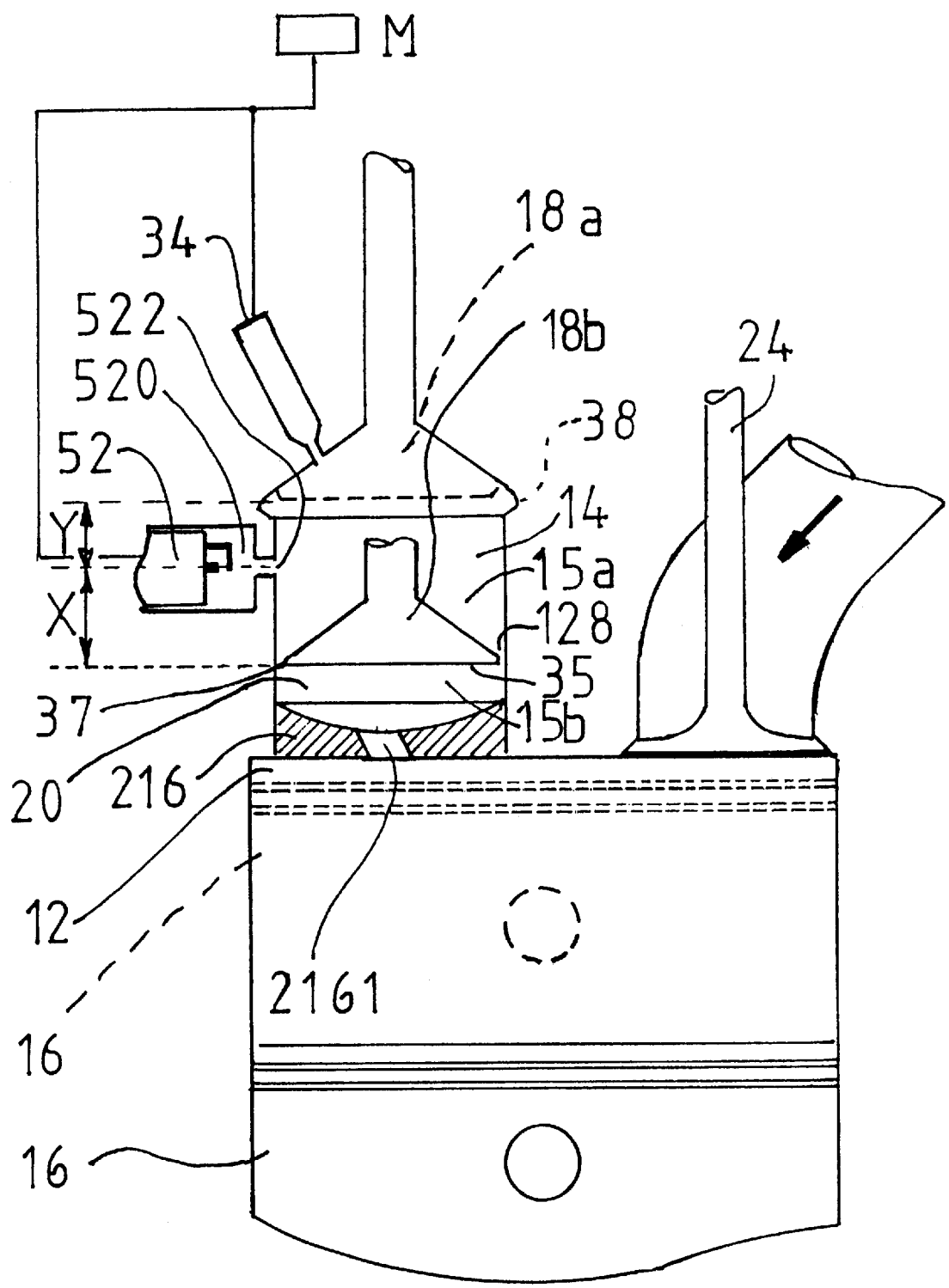
FIG. 2 is an enlarged diagrammatic view of a portion of the prior art arrangement of FIG. 1, shown at the end of the induction stroke in solid lines, and at the end of the compression stoke in broken lines.

The present invention is an improvement upon the disclosure of U.S. Pat. No. 5,803,026; FIGS. 1 and 2 refer to the disclosure of that document. Similar numbers are used in the prior art in the embodiments of the invention, for ease of reference.

The Merritt engine shown in FIG. 1 and FIG. 2 has a larger cylinder 12 and a smaller cylinder 14, which communicate with each other through air orifice 2161. A smaller piston 18 is movable in the smaller cylinder 14 and has a crown 35 with a drive stem 234. The edge 37 of the crown 35 has a radial clearance 128 from the wall 14a (FIG. 3) of the smaller cylinder 14. When the smaller piston 18 is at its inner dead centre position 18a, as in FIG. 1, the space 20 between the crown 35 and the air orifice 2161 becomes the combustion chamber of the engine.

In common with earlier designs of Merritt engines, the air orifice 2161 allows the movement of gases between the larger and smaller cylinders and influences the air movement in space 20 during the compression stroke.

A larger piston 16 is movable in the larger cylinder 12, has a crown 36 and is sealed with the aid of piston rings in the conventional way. Inlet and exhaust valves 24 deliver air and exhaust gases in and out of cylinder 16. Preferably, the inlet air is unthrottled. The two pistons 16 and 18 are moved by separate mechanisms which may be coupled together or are controlled to operate together by a suitable controller C. For example, the smaller piston 18 may be moved by a spring (not shown) and a cam 500 attached to camshaft 600 which rotates at half crankshaft speed.

It will be appreciated that the fuel/air ratio of the mixture inside cavity 520 is determined by the axial position of aperture 522 as shown in FIG. 2. Distance X controls the period when mixture containing gaseous fuel enters the cavity 520 and distance Y controls the period when only air enters the cavity. Distance X plus distance Y equals the complete stroke of the second piston 18. The amount of fuel entering the cavity from the first volume 15a during distance X is not constant, but varies in proportion with the amount of fuel previously delivered into the first volume 15a by fuel injector 34 to meet the engine's power demand. Thus, once distances X and Y have been chosen, the consistency of the fuel/air mixture suitable for dependable spark ignition can only be maintained over a narrow range of engine fueling. The present invention overcomes this difficulty by providing a substantially constant fuel/air mixture in the cavity 520, making it possible to have dependable spark ignition over a very wide range of engine fuelling conditions.

Figure 3:
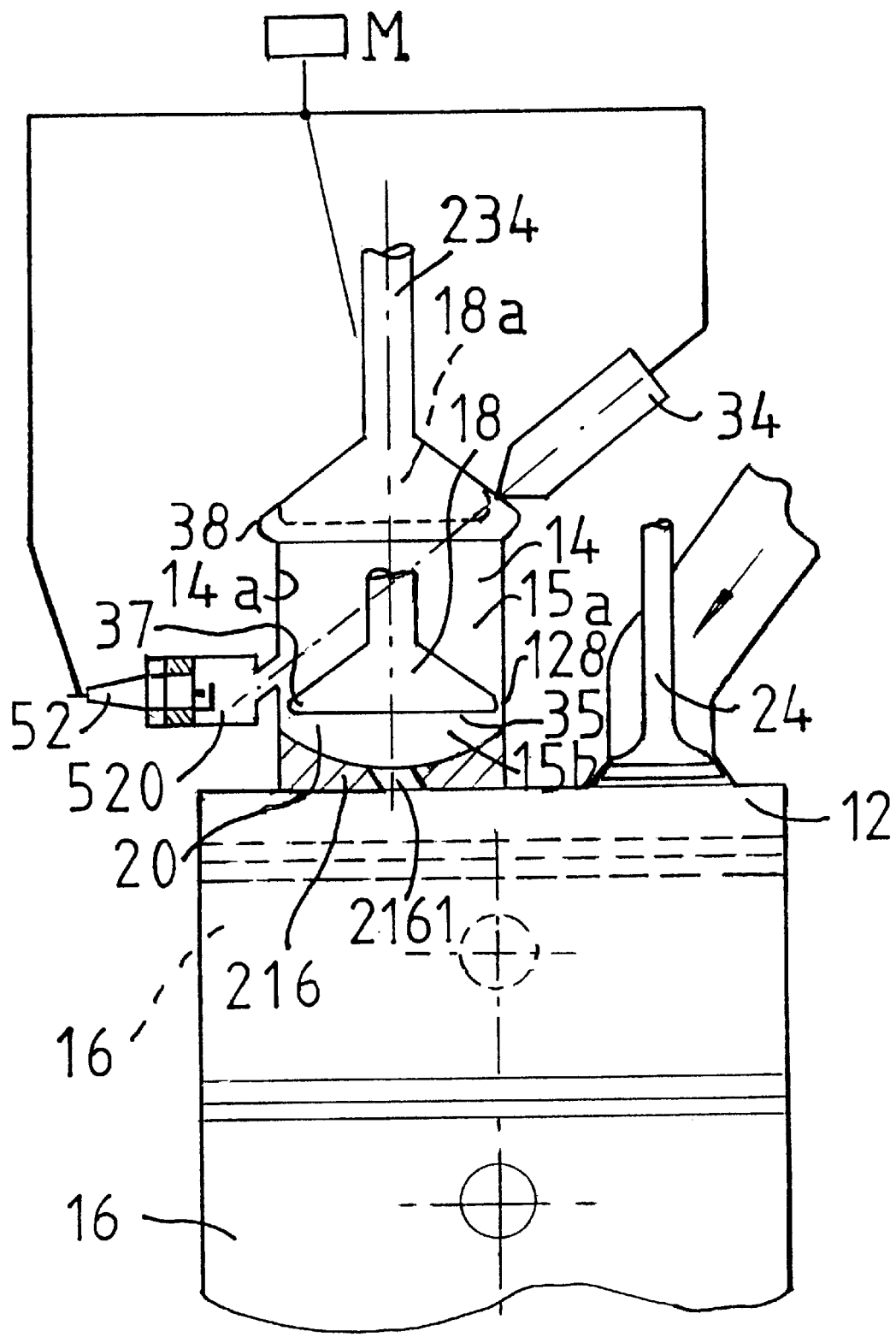
FIG. 3 is a section through a portion of both cylinders of an engine similar to that of FIG. 2 but according to the present invention.

As shown in FIG. 3, and in common with FIGS. 1 and 2, the smaller piston 18 divides the second cylinder 14 into a first volume 15a behind the crown 35 of the smaller piston, and a second volume 15b situated between the two pistons. It will be appreciated that the size of the first and second volumes 15a and 15b vary with the movement of smaller piston 18; when the piston 18 is at its inner dead centre position (FIG. 1), the second volume 15b is maximised, and forms most of the combustion space 20.

The crown 35 of the smaller piston 18 has an edge 37 with an axial thickness which is substantially less than the stroke of piston 18. The peripheral edge 37 is spaced away from the wall 14a of the smaller cylinder to form an annular gap 128.

Substantially liquid fuel is delivered into the first volume 15a of the smaller cylinder 14 by a fuel injector 34. Reference is made to "substantially liquid fuel" herein in recognition of the fact that a part of the fuel may be more or less immediately vaporised on injection.

Figure 4:
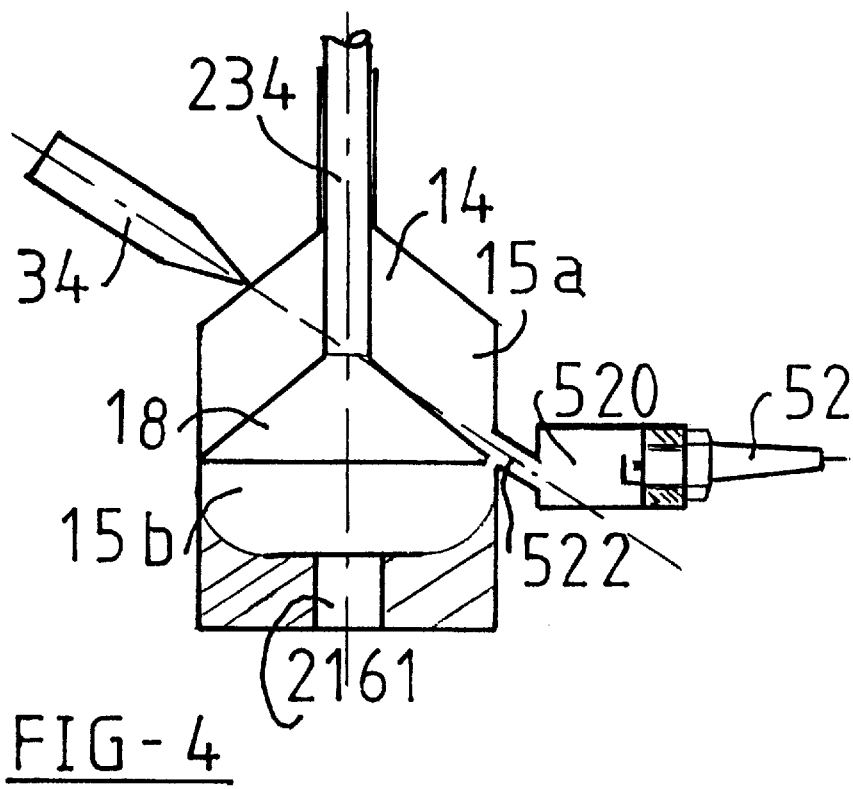
FIG. 4 is a partial section through the smaller cylinder of the engine when the smaller piston is at outer dead centre position.

A cavity 520 is provided in a wall of the smaller cylinder 14. A spark plug 52 is provided in a cavity 520 for ignition. Cavity 520 communicates with the combustion chamber 20 through a restricting hole or aperture 522 (FIG. 4). The fuel injector 34 and spark plug 52 can be controlled by an engine management system M.

In one preferred form of the present invention, fuel injector 34 delivers fuel in the form of at least one substantially coherent jet of substantially liquid fuel along an axis aligned with aperture 522, and aperture 522 is positioned such that it becomes fully exposed to this jet of liquid fuel only when piston 18 is approaching its outer dead centre position as shown in FIGS. 3 and 4.

Figure 5:
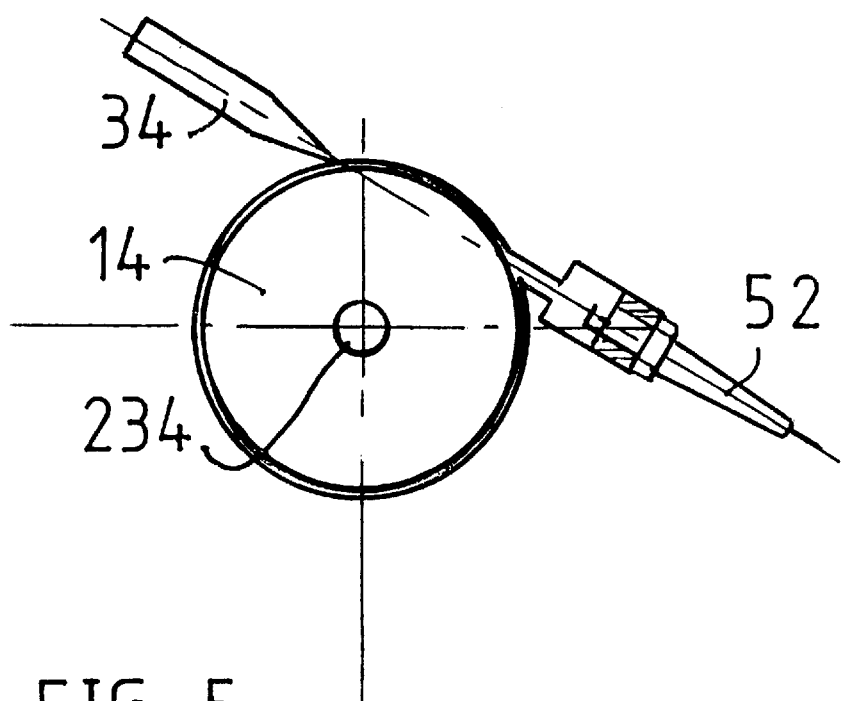
FIG. 5 is a plan view section of FIG. 4.

The orientation of the fuel injector trajectory is offset from stem 234 of piston 18, as seen is FIG. 5, so that fuel does not strike the drive stem 234 in its passage towards the aperture 522.

Figure 7:
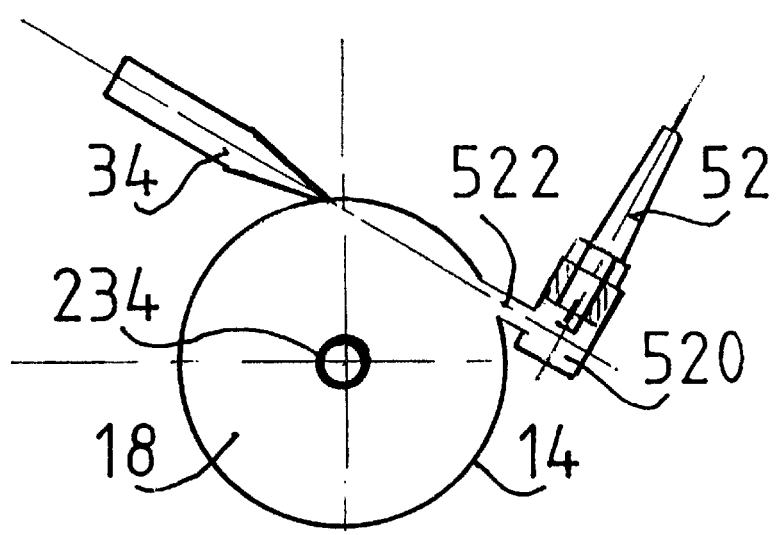
FIG. 7 is a view as FIG. 5 of an alternative embodiment.

The orientation of the spark plug cavity 520 may be chosen to allow access to the spark plug in a multi-cylinder engine. FIG. 7 shows an orientation where both the spark plug 52 and the fuel injector 34 can be accessed from the same side edge of a multi-cylinder engine. In this embodiment the spark plug is also out of direct alignment with the fuel injector 34.

The principle of operation of the invention is as follows:

During both the exhaust and induction strokes of the first piston 16, the second piston 18 moves from its parked or inner dead centre position (corresponding to the position of FIG. 1) to its outer dead centre position (FIGS. 3,4) to effect an induction stroke into volume 15a. In a preferred form of this invention, during this induction stroke as in FIG. 6 a primary (substantially liquid) fuel quantity is injected through injector 34 into the first volume 15a of the smaller cylinder 14. This fuel quantity is mixed with and vaporises into the air and exhaust gas residuals which leak into the first volume 15a through the annular gap 128 around the second piston 18. By keeping the primary fuel quantity segregated in the first volume 15a, the small annular gap 128 together with the piston crown 35 act as the inhibiting means.

Figure 6:
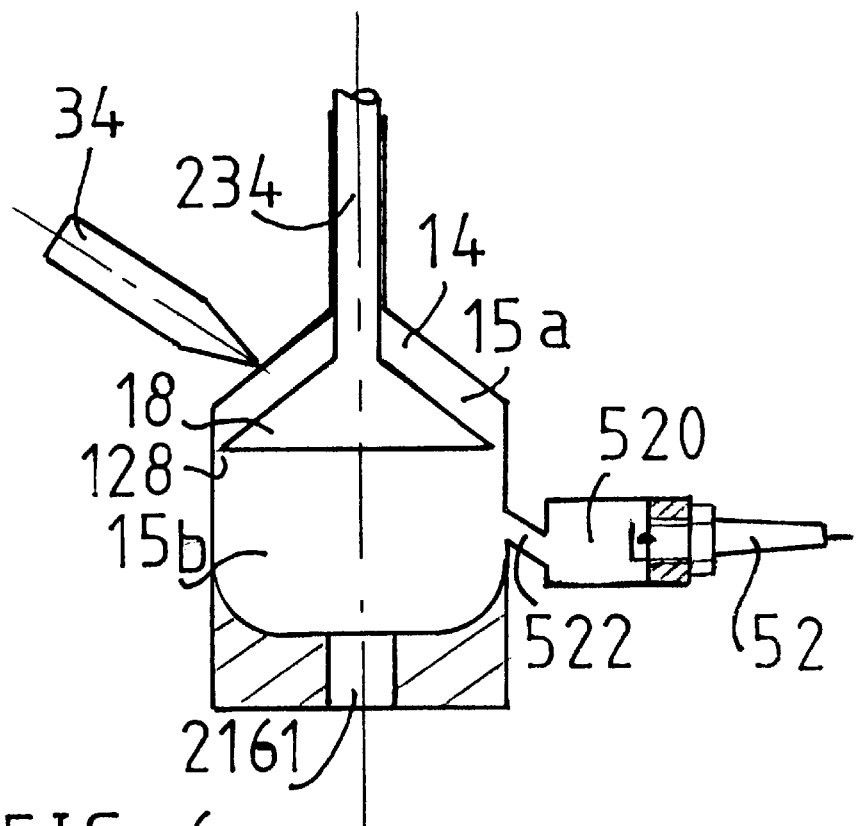
FIG. 6 is a view similar to FIG. 4 showing a different position in the cycle.

During most of the induction period, as shown in FIG. 6, the liquid fuel jet cannot reach aperture 522 as the second piston 18 blocks the flow of fuel into the cavity; the fuel instead will hit the conical face of piston 18 and consequently partially atomise into fine mist. The primary fuel quantity delivered by the first fuel source is provided to help meet the engine's load requirement and is determined by the engine management system shown as controller M in FIG. 3, which in turn controls the timing and duration of injection for this fuel quantity.

At the end of the induction stroke of the second piston 18, aperture 522 is exposed to the trajectory of liquid fuel jet delivery from fuel injector 34 as shown in FIG. 4. At that time a secondary (substantially liquid) fuel quantity is delivered directly into cavity 520 through aperture 522. The secondary fuel quantity is not governed by the load demand on the engine but is determined to provide a substantially chemically correct (stoichiometric) fuel/air mixture in the spark cavity 520.

The timing of the start, and the duration, of the injection of the secondary fuel quantity is again controlled by controller M which can receive a signal for the position of the second piston 18, for example from the position of the camshaft similar to the camshaft 600 of FIG. 1.

Preferably, during the induction stroke of the smaller piston 18 either the exhaust valve or the inlet valve of the engine is open into the larger cylinder 12 so that the pressure in both the second cylinder 14 and inside the spark plug cavity 520 is at or near atmospheric pressure. Accordingly, even when the ignition cavity aperture 522 is open to the first volume 15*a* there is little or no tendency for the fuel/air mixture present in the first volume 15*a* to enter the ignition cavity 520, so that all or substantially all of the fuel present in the ignition cavity is the secondary fuel quantity expressly delivered thereinto. It will be appreciated that fuel injector 34 can be supplied with liquid fuel at a moderately low pressure as it is not required to inject fuel against high gas pressures.

Once pistons 16 and 18 start their compression strokes, substantially together, air substantially without fuel starts to enter the second volume 15*b* of the smaller cylinder 14 through air orifice 2161 and the pressure in the spark plug cavity 520 begins to rise as air enters it and mixes with the secondary fuel quantity which was previously delivered into the cavity 520.

The compressed air is heated by the compression process and it forces any liquid fuel remaining in aperture 522 into the spark plug cavity 520 and vaporises it during the compression stroke. The direction of aperture 522 in relation to cavity 520 may be constructed to impart suitable air movement in cavity 520 to assist rapid vaporisation of the liquid fuel therein.

When the spark plug is energised near the end of the compression stroke, the fuel/air mixture in cavity 520 is approximately stoichiometric, preferably slightly lean, and it will burn without the formation of carbon soot. The flame jet emerging from aperture 522 will be directed towards the periphery of the second piston 18, near its parked or inner dead centre position, at the time when the main vaporised fuel gas mixture, containing the primary fuel quantity which was segregated in volume 15*a*, enters the combustion chamber 20 around peripheral gap 128, which now acts as the transfer means.

Preferably, the air inside the second volume 15*b* is made to swirl around the periphery of the second volume during the compression stroke of the first piston, i.e. the air rotates about an axis parallel and/or coincident with the axis of the stem 234 of the second piston 18. When the fuel/air mixture from the first volume enters the second volume at the end of the compression stroke, this swirling helps to keep the fuel/air mixture rotating just below the peripheral gap 128 at the time of ignition. In this way, even a very small quantity of fuel gas can remain substantially concentrated and ignitable at the time of ignition. The swirling can be imparted for example by the shape, orientation and position of the air orifice 2161, as shown in FIGS. 1–3.

The second cylinder 14 preferably includes an enlargement groove 38 adjacent the inner dead centre position of the second piston 18*a* (FIG. 3) to assist the fuel/gas mixture to enter the second volume 15*b* as the second piston approaches its inner dead centre position. In this embodiment the optional groove 38 also acts as part of the transfer means. FIG. 3 shows this groove 38, though it will be understood that it is preferably present in the other embodiments also.

In a preferred form of the invention the induction stroke of piston 18 happens during both the exhaust stroke and induction strokes of piston 16. The induction strokes of both pistons 16 and 18 end approximately at the same time and both move through their compression strokes approximately together. During the expansion (combustion) stroke of piston 16, piston 18 remains seated as shown in FIG. 1 and in so doing protects the fuel injector 34 from combustion pressures and temperatures and leaves the combustion chamber or space 20 at maximum volume.

When the second piston is at its inner dead centre position, the volume behind it, i.e. between its rear face and its seat, should be minimised. Preferably, the rear face of the second piston engages the seat adjacent the periphery of the piston, sealing off the injector 34 and the stem 234 from the combustion chamber 20.

The delivery of fuel into the spark cavity 520 can take place in a distinct second short injection which can be delayed up to two strokes or 360 crank degrees of the first piston 16 after the start of the delivery of the primary fuel quantity. Alternatively, particularly under low fuelling conditions, a single fuel injection can start before the second piston 18 exposes the spark cavity aperture 522 (as in FIG. 6) and continue whilst the said aperture becomes exposed (as in FIG. 4). The second piston therefore blocks the flow of fuel into the cavity until it passes a certain point in its stroke, whilst the direction of the fuel projected by the injector does not change; alternatively stated, before and after the second piston has passed a given point near its outer dead centre position, fuel is blocked from entering the cavity 520.

Thus, as above indicated, instead of two distinct deliveries of fuel, injector 34 can deliver fuel continuously with the second piston starting and stopping the flow of fuel into the ignition cavity 520 at a certain point along its stroke.

Similarly, if two distinct injections take place during one engine cycle, the secondary fuel quantity delivery may start before aperture 522 is uncovered by the edge of piston 18 and possibly continue slightly after it is covered up again by the edge of piston 18, provided the controller M ensures that the spark plug cavity receives the correct amount of fuel which will form a near stoichiometric mixture, preferably slightly lean mixture, in the spark cavity 520.

The trajectory axis of the fuel injector 34 should preferably coincide with the axis of the spark cavity aperture 522, as shown in FIG. 4, but other fuel injection trajectories which involve the fuel deflecting or reflecting from surfaces inside the second cylinder can be used.

In addition to the jet directed at the aperture 522, the injector may have one or more other jets directed away from the aperture to increase the rate of fuel delivery. In this way, part or all of the primary fuel quantity can be delivered to the first volume 15*a* at the same time as the secondary fuel quantity is being delivered to the ignition cavity 520.

The aperture 522 can advantageously have a funnel-shaped conical mouth in order to improve the collection of the liquid fuel aimed at it.

Preferably, the position of aperture 522 should not be displaced too far from the location of the edge 37 of the second piston 18 when this is at its outer dead centre position, so as to reduce the time for which the cavity aperture 522 is exposed to the fuel/air mixture in the first volume 15a during the early part of the compression stroke and so reduce the likelihood of charging the spark plug cavity 520 with a gaseous mixture containing fuel from the first volume 15a of the second cylinder 14. The quantity of fuel in such gas will vary with engine load and if it is allowed to enter the cavity 520 during the compression stroke; the engine controller M will need to allow for this when determining the secondary fuel quantity, needed for "topping up" the spark cavity 520; this may cause an unnecessary complication.

Figure 8:
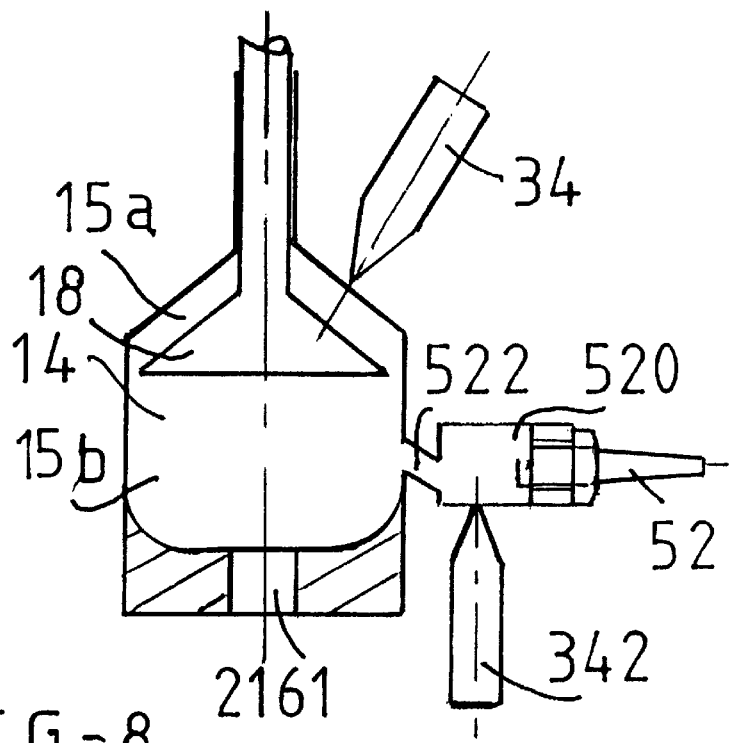
FIG. 8 is a view as FIG. 6 of another alternative embodiment.
Figure 9:
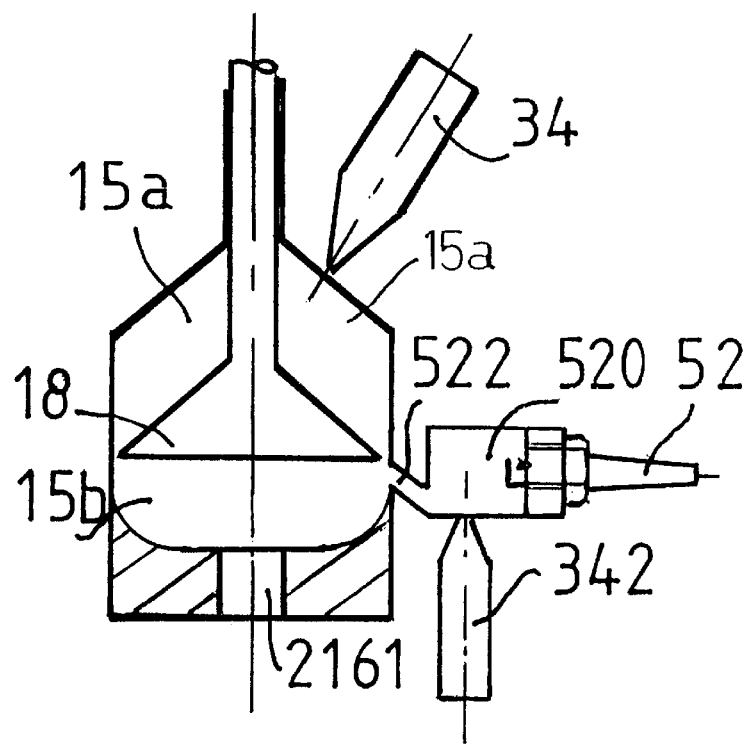
FIG. 9 is a view of yet another alternative embodiment with the second piston at its outer dead centre position.

In the alternative arrangement shown in FIG. 8 and FIG. 9 the supply of fuel directly to ignition or spark cavity 520 can be achieved using a second fuel source 342 as the fuel delivery means provided in addition to first fuel source 34, the first fuel source being used only for providing fuel to said first volume 15a.

Thus, in an alternative embodiment of the present invention, the fuel injector 34 is positioned to deliver liquid fuel, in a form of spray or a jet, into the first volume 15a but is not necessarily aligned with the aperture 522. Injector 34 delivers fuel to the first volume 15a but not into ignition cavity 520. A second fuel supply device 342 delivers a small quantity of fuel into ignition cavity 520 through a small aperture in the wall of cavity 520 to form a spark ignitable fuel/air mixture within cavity 520. Advantageously, the delivery of fuel through injector 34 and device 342 can take place before the start of the compression stroke.

The fuel delivery device 342 is required to deliver a small (secondary) quantity of fuel once in every engine cycle, chosen to form a near stoichiometric fuel/air mixture in the ignition cavity 520 under all engine operating conditions.

It will be appreciated that, during most or all of the compression stroke, the second piston 18 blocks the flow of vaporised fuel contained in the first volume 15a from entering the ignition cavity 520 and allows only air to enter the ignition cavity.

Figure 10:
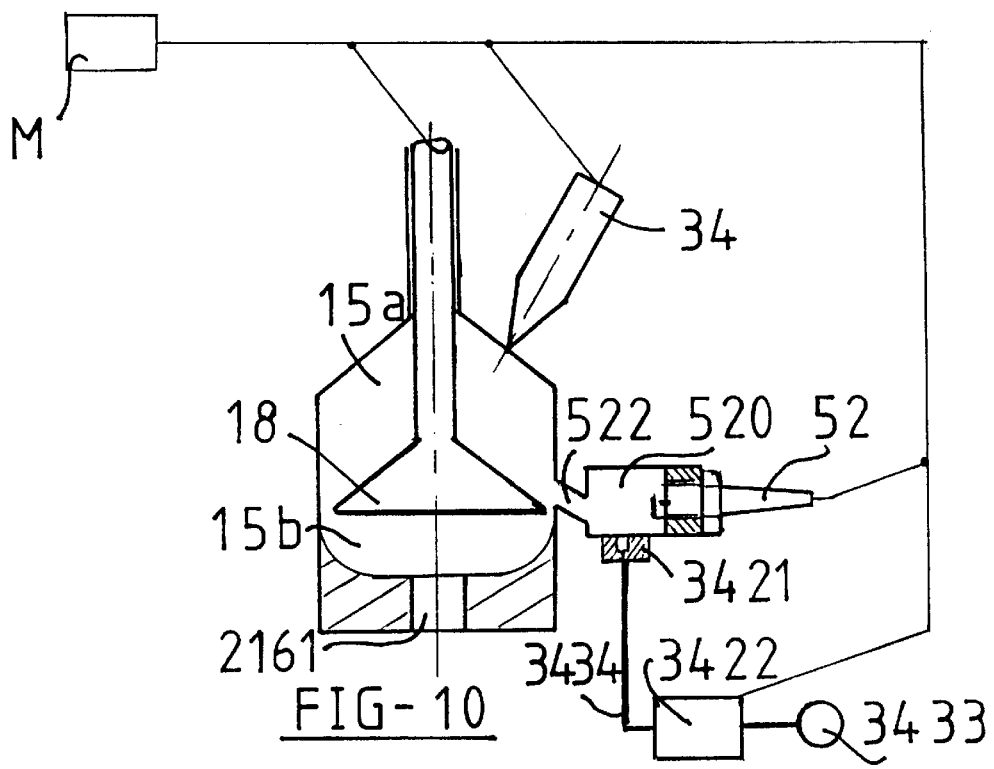
FIG. 10 is view as FIG. 9 of further alternative embodiment.

The fuel delivery device 342 can take a variety of forms. It can take the form shown in FIG. 9 of a miniaturised conventional fuel injector with an outwardly opening discharge valve. Alternatively, in another embodiment shown in FIG. 10 the device comprises a remotely situated solenoid operated fuel injection valve 3422 which meters the pressurised fuel and delivers it through a pipe 3434 to a non-return valve and delivery jet 3421 positioned near the inner wall of cavity 520. In this way the fuel metering valve 3422 can be positioned at a convenient place away from cavity 520, possibly near the fuel pump 3433. In a multi-cylinder engine it may be possible for more than one cylinder to share such a metering valve and accept fuel delivery to its cavity 520 at the same time.

Figure 11:
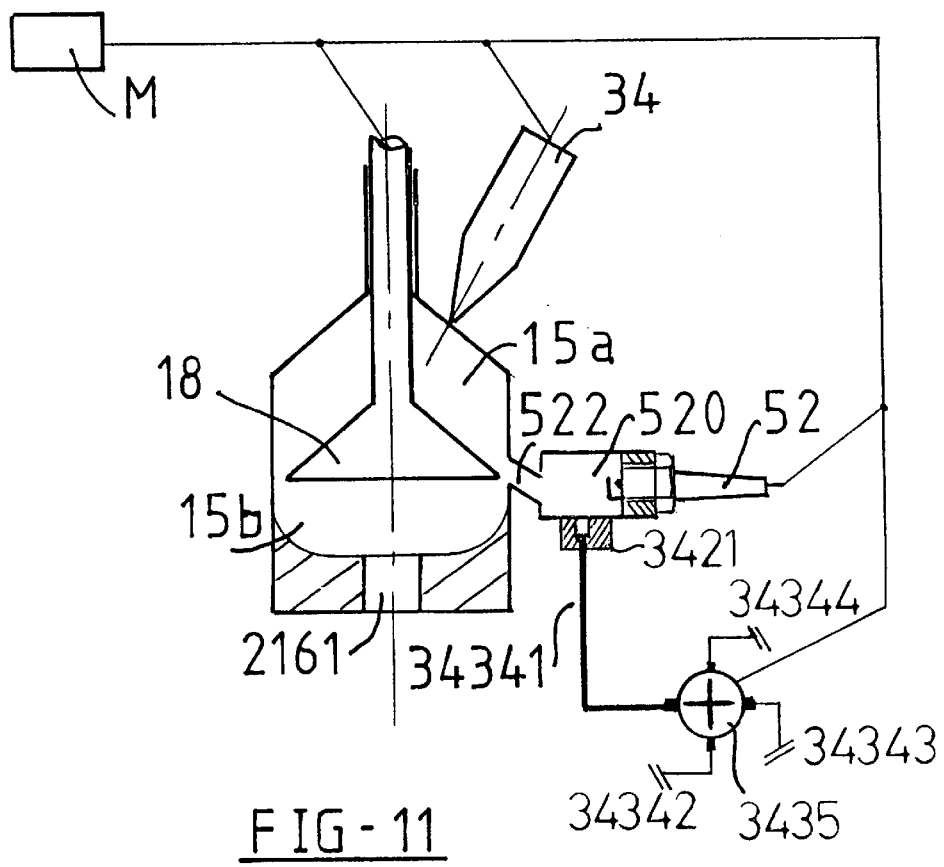
FIG. 11 is a view as FIG. 9 of another further alternative embodiment.

In the embodiment shown in FIG. 11 a small positive multi-chambered displacement pump 3435 is synchronised with engine speed to deliver a desired quantity of fuel and distribute it to cavity 520 of each cylinder once every engine cycle by individual pipes 34341 to 34344, which directly connect one chamber of the fuel pump with an appropriate cavity 520 for a given cylinder or cylinders. If necessary a non-return valve 3421 may be advantageously used at the entry point to cavity 520 in order to isolate the fuel system from combustion pressures. It is possible to pre-heat the fuel supply to the ignition cavity 520 in order to assist cold starting. It is also possible to vaporize the fuel supplied to the ignition cavity, for example in a suitable small electric boiler and to deliver fuel to the cavity 520 in gaseous form; this might also provide easier control over metering of small amounts of fuel.

After fuel delivery into cavity 520 is completed in the embodiment of FIG. 9 the second piston 18 moves towards its inner dead centre position during the compression stroke of the piston 16. During this period the aperture 522 is exposed to compressed air essentially without fuel. This air is forced into cavity 520 and in so doing it vaporises and mixes with the fuel in cavity 520 to form a spark-ignitable mixture, preferably a chemically correct stoichiometric mixture.

It will be appreciated that fuel injector 342 can advantageously deliver a quantity of fuel into cavity 520 irrespective of engine load; under all conditions this quantity of fuel will be determined to form a near stoichiometric fuel/air mixture in cavity 520 after it mixes only with air, so allowing an accurate control over the proportion of air and fuel in cavity 520.

As shown in FIGS. 3, 4, 6 and 8–11 the direction of aperture 522 is advantageously aligned with the edge of the second piston when parked on its seat at its inner dead centre position, in order to assist direct contact between the plasma flame jet emerging from cavity 520 after the spark event and the fuel which emerges from around the periphery of the second piston at the end of the compression stroke.

As also shown in FIG. 4, aperture 522 is advantageously positioned just above the edge of the smaller piston 18 when at its outer dead centre position in order to avoid ingressing fuel from the first volume 15a into cavity 520 during the compression stroke of the smaller piston 18. However, it will be understood that since in the embodiments of FIGS. 8–11 the second fuel quantity is delivered to the ignition cavity 520 by the injector 342 (or valve 3421), there is no requirement for the piston 18 to expose the aperture 522 to the first volume 15a, and the aperture 522 can if desired be located beyond the outer dead centre position of the smaller piston 18 as shown in the embodiment of FIG. 9.

It will be appreciated that because the air entering the first cylinder 12 through inlet valve 24 can be advantageously unthrottled under all operating conditions the quantity of air in cavity 520 will remain approximately the same within narrow limits and will only vary with volumetric efficiency essentially with engine speed but not with load. The control of the metering of fuel into cavity 520 allows for this and can be made to ensure that the spark plug always ignites a slightly leaner than stoichiometric fuel/air mixture in ignition cavity 520 to ensure that the spark plug never becomes sooty.

It will also be appreciated that this invention enables the use of an ignition cavity directly supplied with the quantity of liquid fuel necessary for dependable spark ignition in the knowledge that only air and substantially no further fuel enters the cavity during the compression stroke of the Merritt engine.

What is claimed is:

1. An internal combustion engine comprising:
   at least one pair of first and second cylinders, the first cylinder having a larger swept volume that the second cylinder;
   respective first and second pistons reciprocable in said cylinders, the second piston dividing the second cylinder into a first volume and a second volume such that the first and second volumes are at opposite sides of the second piston, the second volume also being between the two pistons;

an air inlet conduit communicating with the first cylinder;

an exhaust conduit communicating with the first cylinder;

means defining a common combustion space between said pistons when said pistons are substantially at their inner dead centre positions, said combustion space including said second volume;

transfer means for enabling gas flow from said first volume into said second volume towards the end of the compression stoke of the second piston;

inhibiting means for inhibiting movement of fuel air mixture from said first volume into said second volume until towards the end of the compression stroke of said second piston;

a first fuel source for providing fuel to the first volume;

drive means for driving said second piston;

a cavity formed in a side wall of the second cylinder and opening into said second cylinder through aperture means;

a spark ignition device located in said cavity; and fuel delivery means for supplying a quantity of substantially liquid fuel into said cavity to be vaporised therein and form a spark-ignitable fuel/air mixture inside the cavity, said quantity of substantially liquid fuel being determined independently of the amount of fuel delivered by the first fuel source to meet the engine's power demand.

2. An internal combustion engine according to claim 1 characterised in that the first fuel source is adapted to deliver a fuel quantity directly into the first volume, and the fuel delivery means is adapted to deliver another fuel quantity directly into the cavity.

3. An internal combustion engine according to claim 2 characterised in that the first fuel source is also the fuel delivery means.

4. An internal combustion engine according to claim 3 characterised in that the aperture means is aligned with the first fuel source.

5. An internal combustion engine according to claim 4 characterised in that the crown of the second piston obscures the aperture means from the first fuel source during part of its range of movement, and exposes the aperture to the first fuel source during another part of its range of movement.

6. An internal combustion engine according to claim 1 characterised in that the fuel delivery means is connected to a wall of the cavity.

7. An internal combustion engine according to claim 1 characterised in that the drive means includes means for maintaining the second piston substantially stationary at or adjacent its inner dead centre position during at least a portion of the expansion stroke of the first piston.

8. An internal combustion engine according to claim 1 characterised in that the means defining a common combustion space includes an air orifice between the first cylinder and the second volume, the air orifice being adapted to impart rotation around the periphery of the second volume during the compression stroke of the first piston.

9. An internal combustion engine according to claim 1 characterised in that the aperture means is aimed substantially at the periphery of the crown of the second piston when the second piston is located at its inner dead centre position.

10. An internal combustion engine according to claim 1 characterised in that the quantity of substantially liquid fuel is delivered into the cavity by the fuel delivery means in the form of a jet directed across a part of the second cylinder.

11. An internal combustion engine according to claim 1 in which the first fuel source provides a primary quantity of fuel and the fuel delivery means provides a secondary quantity of fuel, characterised in that the secondary quantity of fuel is determined independently of the primary quantity of fuel.

12. An internal combustion engine according to claim 11 characterised in that the secondary quantity of fuel undergoes a deflection or reflection before entering the cavity.

* * * * *